United States Patent
Dahlberg et al.

(10) Patent No.: US 9,086,953 B2
(45) Date of Patent: Jul. 21, 2015

(54) DEVICE THAT UPDATES BITS CORRESPONDING TO A DATA RECORD RESIDING IN A MEMORY

(75) Inventors: Martin Dahlberg, Gothenburg (SE); Magnus Wibeck, Gothenburg (SE)

(73) Assignee: SATO HOLDINGS KABUSHIKI KAISHA (JP)

( * ) Notice: Subject to any disclaimer, the term of this patent is extended or adjusted under 35 U.S.C. 154(b) by 830 days.

(21) Appl. No.: 13/003,590

(22) PCT Filed: Apr. 9, 2009

(86) PCT No.: PCT/JP2009/057280
§ 371 (c)(1),
(2), (4) Date: Jan. 11, 2011

(87) PCT Pub. No.: WO2010/095280
PCT Pub. Date: Aug. 26, 2010

(65) Prior Publication Data
US 2011/0116119 A1    May 19, 2011

(30) Foreign Application Priority Data
Feb. 23, 2009    (JP) .................. 2009-039052

(51) Int. Cl.
*G06F 12/02* (2006.01)
*G06F 3/12* (2006.01)

(52) U.S. Cl.
CPC ............ *G06F 12/0246* (2013.01); *G06F 3/122* (2013.01); *G06F 3/1243* (2013.01); *G06F 3/1285* (2013.01); *G06F 2212/1036* (2013.01); *G06F 2212/7209* (2013.01)

(58) Field of Classification Search
CPC ..................... G06F 3/06; G06F 7/76
USPC ...................................... 715/234
See application file for complete search history.

(56) References Cited

U.S. PATENT DOCUMENTS

| 6,725,321 | B1 | 4/2004 | Sinclair et al. ................ 711/103 |
| 7,802,072 | B2* | 9/2010 | Takemura ..................... 711/173 |
| 2003/0172127 | A1 | 9/2003 | Northrup et al. .............. 709/219 |
| 2007/0201073 | A1 | 8/2007 | Masumoto ................... 358/1.13 |
| 2010/0070288 | A1* | 3/2010 | Pandey et al. .................... 705/1 |

FOREIGN PATENT DOCUMENTS

| JP | 6-124596 A | 5/1994 |
| JP | 2000-76117 A | 3/2000 |
| JP | 2002-334586 A | 11/2002 |
| JP | 2007-188237 A | 7/2007 |
| WO | WO 01/93071 A2 | 12/2001 |

OTHER PUBLICATIONS

Applicant Admitted Prior Art (see Background Section of the Specification).*
Supplemental European Search Report dated Dec. 20, 2012 issued in corresponding European Patent Application No. EP 09840384.3, pp. 2 through 5 are of relevance.

* cited by examiner

*Primary Examiner* — Andrew Dyer
*Assistant Examiner* — Tionna Burke
(74) *Attorney, Agent, or Firm* — Ostrolenk Faber LLP

(57) ABSTRACT

Disclosed is a device that changes a bit in a string of bits representing a character in a sting of characters defining a reserved word associated with a record containing pieces of information in response to a request for changing a piece of information in the record, and a printer configured to exclude from printing a record associated with a reserved word that has been changed by the device.

7 Claims, 6 Drawing Sheets

Fig. 3

```
<db>
 <employee id="001">
   <name>Ichirou Sato</name>
   <section>General Affairs</section>
   <sex>M</sex>
   <age>25</age>
 </employee>
 < Employee id ="015">
   <name>Jirou Sato </name>
   <section>Personnel</section>
   <sex>M</sex>
   <age>29</age>
 </Employee>
 < employee id ="100">
   <name>Saburou Sato</name>
   <section>General Affairs</section>
   <sex>M</sex>
   <age>35</age>
 </employee>
 < employee id ="015">
   <name>Jirou Sato</name>
   <section>Accounting</section>
   <sex>M</sex>
   <age>29</age>
 </employee>
</db>
```

Fig. 5

```
<db>
 <employee id="001">
   <name>Ichirou Sato</name>
   <section>General Affairs</section>
   <sex>M</sex>
   <age>25</age>
 </employee>
 < employee id ="015">
   <name>Jirou Sato</name>
   <section>Personnel</section>
   <sex>M</sex>
   <age>29</age>
 </employee>
 < employee id ="100">
   <name>Saburou Sato</name>
   <section>General Affairs</section>
   <sex>M</sex>
   <age>35</age>
 </employee>
</db>
```

PRIOR ART

Fig. 6

```
<db>
 <employee id="001">
   <name>Ichirou Sato</name>
   <section>General Affairs</section>
   <sex>M</sex>
   <age>25</age>
 </employee>
 < employee id ="015">
   <name>Jirou Sato</name>
   <section>Accounting</section>
   <sex>M</sex>
   <age>29</age>
 </employee>
 < employee id ="100">
   <name>Saburou Sato</name>
   <section>General Affairs</section>
   <sex>M</sex>
   <age>35</age>
 </employee>
</db>
```

PRIOR ART

DEVICE THAT UPDATES BITS CORRESPONDING TO A DATA RECORD RESIDING IN A MEMORY

CROSS REFERENCE TO RELATED APPLICATIONS

The present application is a 35 U.S.C. §371 national phase conversion of PCT/JP2008/057280, filed Apr. 9, 2009, which claims priority of Japanese Patent Application No. 2009-039052, filed Feb. 23, 2009, the content of which is incorporated herein by reference. The PCT International Application was published in the Japanese language.

FIELD OF INVENTION

The present invention relates to a data updating device for updating data that are stored in record units in a flash memory and described in a markup language such as XML (Extensible Markup Language) by modifying a description content thereof, and a printer device for executing printing processing in accordance with data described in a markup language that have been modified by the data updating device.

BACKGROUND ART

A conventional flash memory, which is a type of non-volatile memory EEPROM, is provided in a NOR type and a NAND type. A NOR type flash memory in particular is used as a substitute memory for a ROM. In this flash memory, data rewriting is performed in units of predetermined areas (sectors, for example). The number of times rewriting can be performed in each area is limited. Therefore, a data storage (updating) method in which all areas are used as evenly as possible, without fixing areas in which rewriting occurs frequently and areas in which rewriting occurs rarely, has been proposed in Japanese unexamined patent application H6-124596 to extend the useful life of the flash memory as far as possible.

For example, record unit data (a database) described in XML (Extensible Markup Language) are updated in the following manner.

An XML description shown in FIG. 5 expresses record unit data constituted by the items "employee ID", "name", "section", "sex", and "age", and a description sandwiched between two tags (reserved words) <employee id= . . . > and </employee> corresponds to a record. These data (this database) express an employee list such as the following.
Employee ID: 001
Name: Ichirou Sato
Section: General Affairs
Sex: Male (M)
Age: 25
Employee ID: 015
Name: Jirou Sato
Section: Personnel
Sex: Male (M)
Age: 29
Employee ID: 100
Name: Saburou Sato
Section: General Affairs
Sex: Male (M)
Age: 35

For example, when the section of the employee identified by "Employee ID: 015, Name: Jirou Sato" is modified from "Personnel" to "Accounting", the data described in XML shown in FIG. 5 are modified as shown in FIG. 6. More specifically, <section>Personnel</section>, which is included in the description sandwiched between the reserved words <employee id=0015>, </employee>, is modified to <section>Accounting</section>. When data modification is performed in this manner on a flash memory, specific processing is executed as follows.

First, the parts of the sector in the description shown in FIG. 5 that are not to be modified (all parts other than "Personnel") are copied to another sector and "Accounting" is added to the other sector so as to be sandwiched between the reserved words <section>, </section>. Next, the data corresponding to the description in the original sector shown in FIG. 5 are deleted. Thus, data corresponding to the description shown in FIG. 6 remain in the other sector of the flash memory. As a result, the data corresponding to the description shown in FIG. 5 are updated to the data corresponding to the description shown in FIG. 6. Note that reserved words such as <employee id= . . . > and </employee> are control character strings determined according to the XML format, and cannot usually be modified in a similar manner to other variable data.
Patent Document 1: Japanese Unexamined Patent Application Publication H6-124596

However, in the conventional data updating method described above, even when data stored in a predetermined area (sector) are modified only partially, new data must be written (or copied) in relation to the entire predetermined area (sector) and all of the data in the predetermined area (sector) must be deleted. As a result, a comparatively large amount of time is required to update the data. Furthermore, when partial modification is performed in a flash memory, an entire predetermined area (sector), which is limited in the number of possible deletions, must invariably be deleted once. Consequently, the lifespan of the flash memory is shortened every time data are updated.

DISCLOSURE OF THE INVENTION

The present invention has been designed in consideration of these circumstances and of the fact that in a flash memory any single bit of data to be written can be modified from 1 to 0 individually without affecting the lifespan. A data updating device according to the present invention can shorten the amount of time required to update data in a flash memory and can suppress reductions in the lifespan of the flash memory.

A printer device according to the present invention executes printing processing in accordance with data described in a markup language and stored in the flash memory that have been updated by a data updating device according to the present invention.

A data updating device according to the present invention updates record unit data that are described in a markup language and stored in a flash memory by modifying a description content thereof, and includes: reserved word modifying means for modifying a bit of a binary representation of character strings constituting the reserved words from 1 to 0 when a request is issued to update a description sandwiched between reserved words and corresponding to a record; and data adding means for additionally recording, in the flash memory, the record corresponding to the description sandwiched between the reserved words and including the part modified in accordance with the request.

According to this constitution, in a description sandwiched between reserved words and corresponding to a record that relates to an update request, a bit of a binary representation of the character strings constituting the reserved words is modified from 1 to 0, and therefore the record corresponding to the update request can be identified as a description part sandwiched between the reserved words in which a bit of the binary representation thereof has been modified from 1 to 0. Hence, when the data stored in the flash memory are used, the record that relates to the update request and corresponds to the identifiable description can be ignored. Further, the record that corresponds to the description sandwiched between the reserved words including the part that has been modified in accordance with the request is recorded additionally in the flash memory. Therefore, considering that the record relating to the update request can be ignored, it may be recognized that the record relating to the update request has essentially been updated.

Further, in the data updating device according to the present invention, the reserved words may be written in lower case letters and the reserved word modifying means may modify a part or all of the lower case letters included in the reserved words to upper case letters.

According to this constitution, when a lowercase letter is modified to an upper case letter, for example, in terms of binary notation, a bit is modified from 1 to 0. For example, the lower case letter e is represented in binary notation by "01100101b", and the upper case letter E is represented in binary notation by "01000101b". Therefore, when the lower case letter e included in the reserved word is modified to the upper case letter E, the sixth bit from the right, in terms of binary notation, is modified from 1 to 0. Further, the reserved word modifying means may be constituted to modify a reserved word including the character string employee to a reserved word including the character string EMPLOYEE.

Further, for example, the reserved mode modifying means may be constituted to modify a reserved word including the character string employee to a reserved word including the character string Employee.

Further, XML may be used as the markup language, although there are no particular limitations thereon.

A printer device according to the present invention executes printing processing in accordance with record unit data described in a markup language and read from a flash memory, and includes: reserved word determining means for determining whether or not a bit of a binary representation of character strings constituting reserved words sandwiching a description that corresponds to a record has been modified from 1 to 0; and control means for excluding the record corresponding to the description sandwiched between the reserved words from the printing processing when the reserved word determining means determine that the character strings constituting the reserved words have been modified.

According to this constitution, when a bit of the binary representation of the character strings constituting the reserved words sandwiching the description that corresponds to the record is modified from 1 to 0, the record corresponding to the description sandwiched between the reserved words is excluded from the printing processing. Therefore, the content of the updated data created by the data updating device can be printed.

Further, in the printer device according to the present invention, the reserved word determining means may determine whether or not apart or all of lower case letters of the character strings constituting the reserved words have been modified to upper case letters.

According to this constitution, when a lowercase letter of the character strings constituting the reserved words is modified to an upper case letter, for example when the letter e is modified to the letter E, the record corresponding to the description sandwiched between the reserved words is excluded from the printing processing.

There are no particular limitations on the markup languages that can be used in the processing performed by the printer device, but XML may be used.

With the data updating device according to the present invention data can be essentially updated by modifying character strings of reserved words corresponding to a record relating to an update request in a description sandwiched between the reserved words from 1 to 0 in terms of binary notation and additionally recording the record that corresponds to the description sandwiched between the reserved words and including the part that has been modified in accordance with the request in a flash memory. Hence, the time required to update the data can be shortened without the need to record and delete the data in an entire predetermined area (a sector, for example). Moreover, the data in an entire predetermined area (a sector, for example) of the flash memory are not recorded and deleted, and therefore reductions in the lifespan of the flash memory, in which the number of deletions in each predetermined area is limited, can be suppressed.

Further, with the printer device according to the present invention, when a bit of a binary representation of character strings constituting reserved words sandwiching a description that corresponds to a record is modified from 1 to 0, the record corresponding to the description sandwiched between the reserved words is excluded from printing processing. Therefore, the printing processing can be executed in accordance with the data described in a markup language and stored in the flash memory that have been modified by the data updating device according to the present invention.

BRIEF DESCRIPTION OF THE DRAWINGS

FIG. 3 is a view showing an example of a database updated by processing performed in accordance with the procedure shown in FIG. 2;

FIG. 5 is a view showing an example of data described in XML; and

FIG. 6 is a view showing an example of data described in XML obtained by updating the data shown in FIG. 5.

Figure 1:
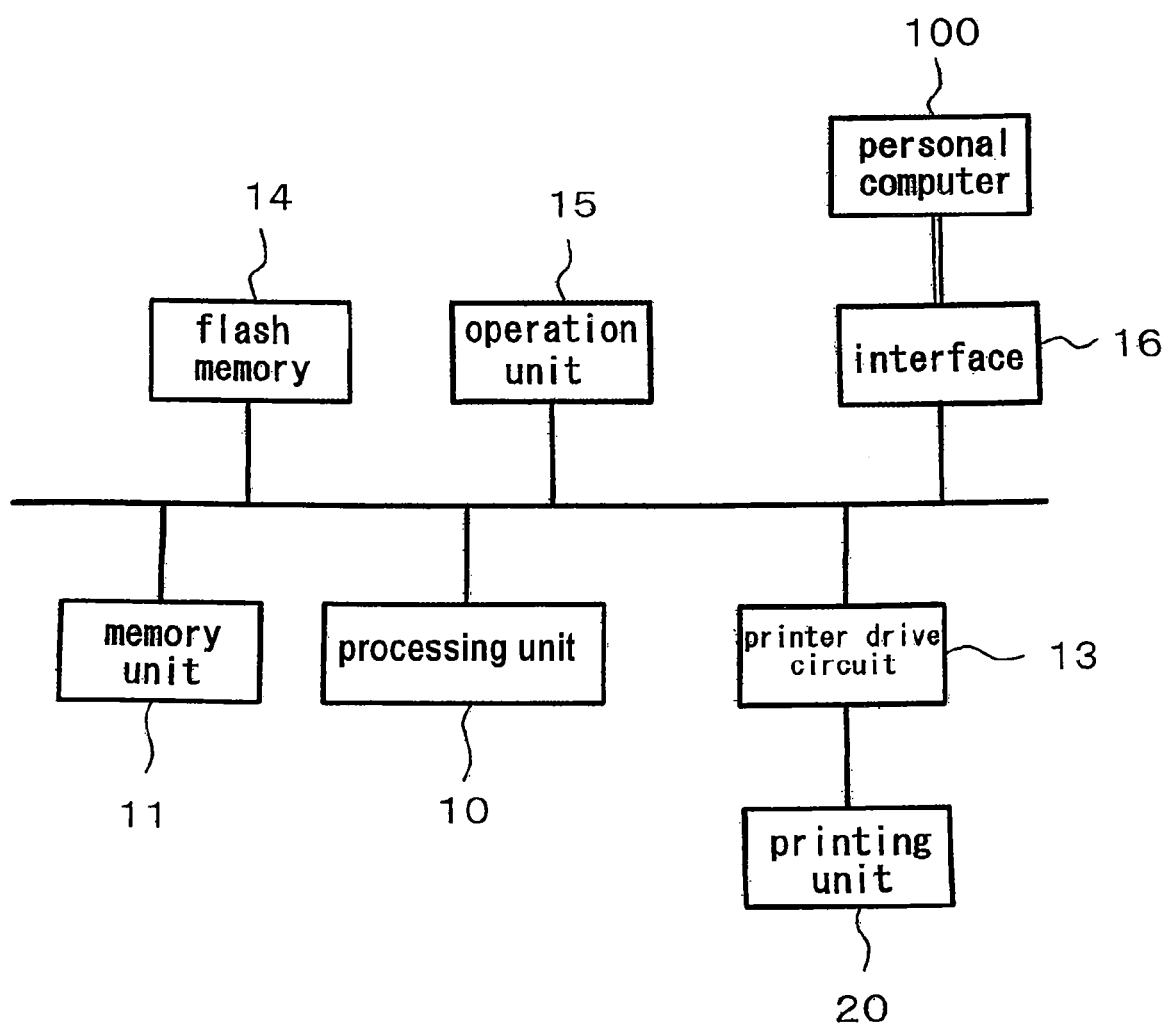
FIG. 1 is a block diagram showing the constitution of a printer device including a data updating device according to the present invention.

DESCRIPTION OF REFERENCE NUMERALS 10 printing unit
11 memory unit
13 printer drive circuit
14 flash memory
15 operation unit
16 interface
20 printing unit
100 personal computer (PC)

BEST MODE FOR CARRYING OUT THE INVENTION

An embodiment of the present invention will be described below using the drawings.

A printer device including a data updating device according to an embodiment of the present invention is constituted as shown in FIG. 1. The printer device includes a processing unit 10 (CPU), a memory unit 11 constituted by a memory device such as a RAM, a printer drive circuit 13 for operating a printing unit 20, a flash memory 14, an operation unit 15, and an interface 16 connected to a personal computer (PC) 100, these units being connected by a bus, for example. The processing unit 10 is capable of executing processing in accordance with an operation signal based on an operation of the operation unit 15. The processing unit 10 is also capable of transmitting and receiving data to and from the personal computer 100 via the interface 16. The memory unit 11 is capable of storing various types of data required in the processing performed by the processing unit 10.

The flash memory 14 stores a database. The database is constituted by record unit data described in XML and shown in FIG. 5, for example, and represents an employee list. The processing unit 10 controls the printer drive circuit 13 to cause the printing unit 20 to execute a printing operation corresponding to the data in the database stored in the flash memory 14. The processing unit 10 is also capable of updating the database stored in the flash memory 14 (i.e. functioning as the data updating device) in accordance with a modification request obtained from the operation unit 15 or from the personal computer 100 via the interface 16.

Figure 2:
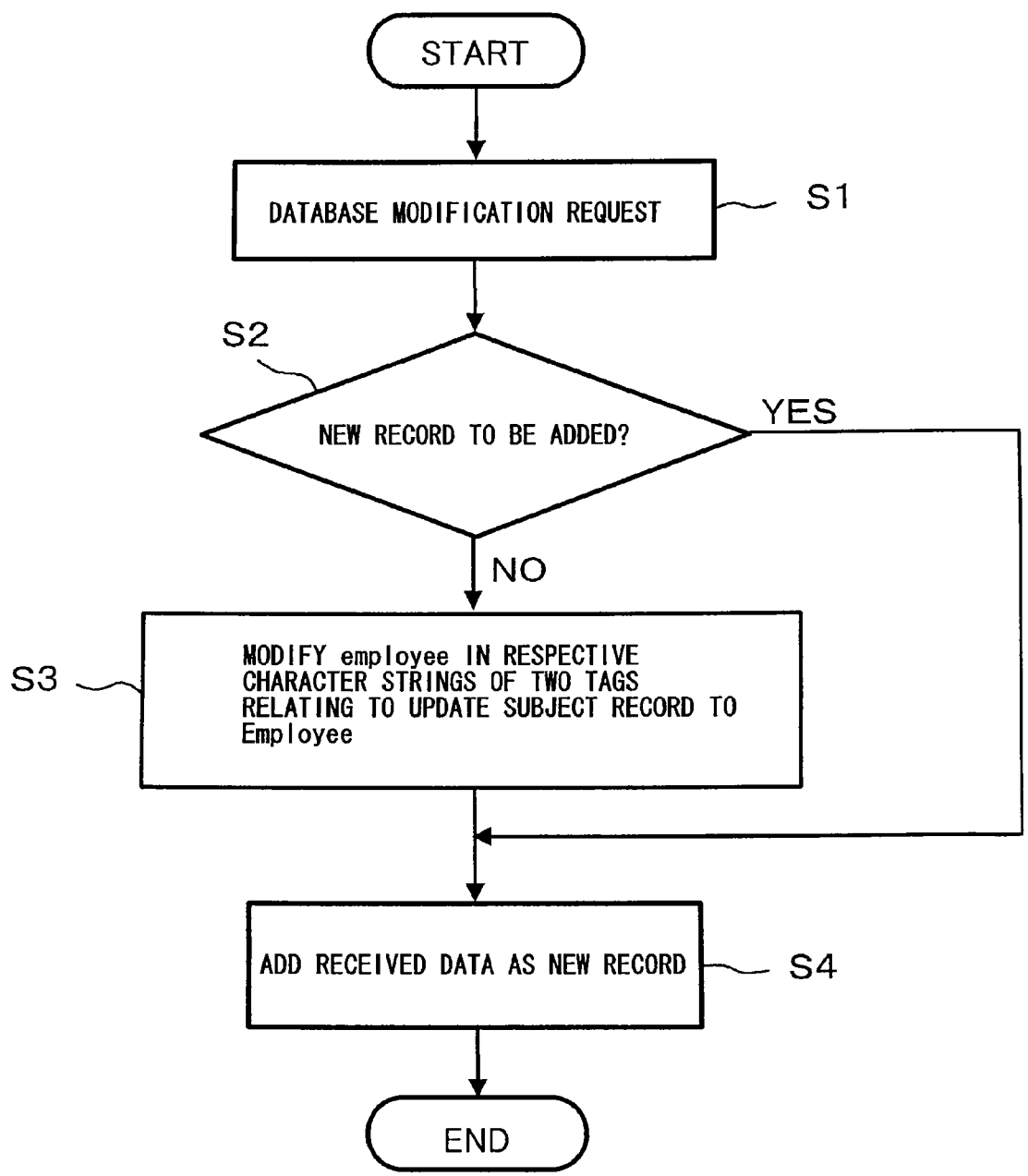
FIG. 2 is a flowchart showing a processing flow relating to updating processing performed on data stored in a flash memory.

The processing unit 10 executes updating processing on the database stored in the flash memory 14 in accordance with a processing procedure shown in FIG. 2.

In FIG. 2, the processing unit 10, having received a database update request together with update content from the operation unit 15 or the personal computer 100 (S1), determines whether or not the update is for adding a new record (S2). When the update is for adding a new record, or in other words adding data relating to a new employee (YES in S2), the processing unit 10 writes the received data (the update content) to the flash memory 14 as a new record represented by a description sandwiched between reserved words <employee id= . . . >, </employee> (S4).

On the other hand, when the update relating to the request is for modifying the content of a pre-existing record rather than adding a new record (NO in S2), the processing unit 10 rewrites a lower case letter "e" at the head of each of the reserved words <employee id= . . . >, </employee> sandwiching the description that corresponds to the update subject record to an upper case letter "E" (S3). A byte notation of the letter "e" is "01100101b" while a byte notation of the letter "E" is "01000101b". Therefore, the letter "e" can be modified to the letter "E" individually and without affecting the lifespan of the flash memory 14 by simply modifying the sixth bit from the right, in terms of binary notation, from 1 to 0.

More specifically, when a section of an employee identified by "Employee ID: 015, Name: Jirou Sato" is modified from "Personnel" to "Accounting" in the database described as shown in FIG. 5, the description

```
<employee id="015">
    <name>Jirou Sato</name>
    <section>Personnel</section>
    <sex>M</sex>
    <age>29</age>
</employee>
``` corresponding to the update subject record is modified to

```
<Employee id="015">
    <name>Jirou Sato</name>
    <section>Personnel</section>
    <sex>M</sex>
    <age>29</age>
</Employee>
``` as shown in FIG. 3.

The processing unit 10 then writes a new record represented by description including the received modified part "Accounting" and sandwiched between the reserved words <employee id="015">, </employee>, i.e.

```
<employee id="015">
    <name>Jirou Sato</name>
    <section>Accounting</section>
    <sex>M</sex>
    <age>29</age>
</employee>
``` to the flash memory 14 (S4).

As a result of the modification processing described above, the database stored in the flash memory 14 is modified from the content represented by the description shown in FIG. 5 to the content represented by the description shown in FIG. 3.

By means of the updating processing described above, the reserved words <employee id="015">, </employee> corresponding to the record that relates to the update request are modified to <Employee id="015">, </Employee> by modifying the lower case letter "e" at the head of the respective reserved words to the upper case letter "E". Therefore, the modified record can be identified by the reserved words <Employee id="015">, </Employee>, which are different to the reserved words of other records. Hence, upon use of the database stored in the flash memory 14, the record corresponding to the description specified by the reserved words <Employee id="015">, </Employee> can be identified as a record on which updating has already been executed and eliminated as a use subject. Further, a new record represented by the description sandwiched between the reserved words <employee id="015">, </employee> and including the part <section>Accounting</section> that has been modified in accordance with the modification request is written to the flash memory 14. Therefore, considering that the record corresponding to the update request can be eliminated as a use subject, it may be recognized that the record of the employee identified by "Employee ID: 015, Name: Jirou Sato", which relates to the update request, has been updated.

According to this updating processing, the database stored in the flash memory 14 can be updated by a two-byte modification to modify the lower case letter "e" of the reserved words to the upper case letter "E" and processing to add a modified record corresponding to the modification request. Hence, the need to record and delete the data of an entire sector is eliminated, leading to a reduction in the amount of time required for data updating. Moreover, since the data of an entire sector of the flash memory 14 are not recorded and deleted, a reduction in the lifespan of the flash memory 14, in which the number of sector deletions is limited, can be suppressed.

Next, printing processing performed in accordance with the database stored in the flash memory 14 will be described. The processing unit 10 executes the printing processing in accordance with a processing procedure shown in FIG. 4.

Figure 4:
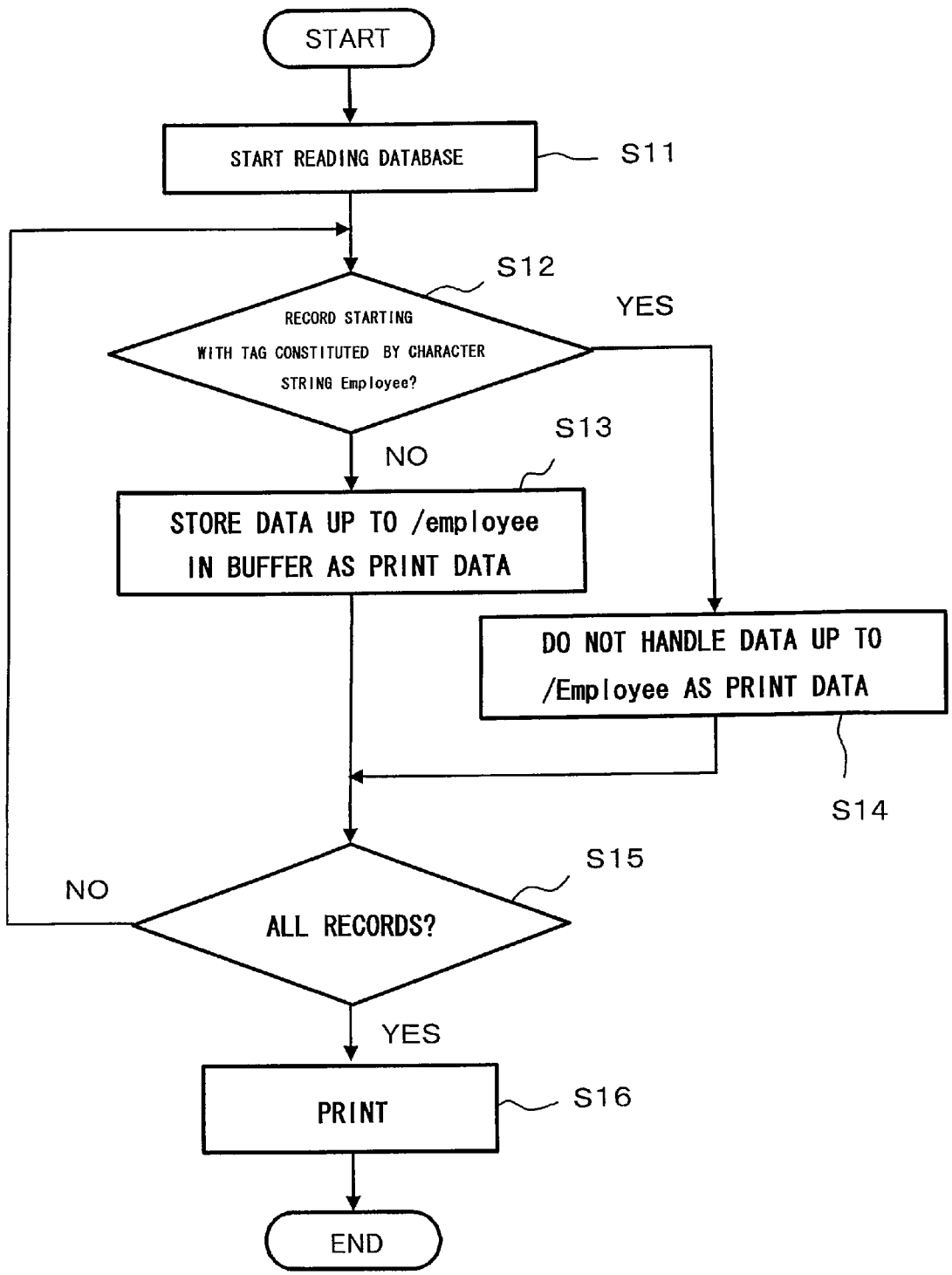
FIG. 4 is a flowchart showing a flow of printing processing.

In FIG. 4, the processing unit 10 starts to read the database stored in the flash memory 14 (S11). For example, record unit data described by XML, as shown in FIG. 3, are read sequentially in accordance with a description order thereof. During this process, the processing unit 10 determines whether or not a read record begins with the reserved word <Employee id= . . . > (S12). When the read record begins with the reserved word <employee id= . . . > rather than <Employee id= . . . > (NO in S12), the processing unit 10 buffers the data up to the corresponding reserved word </employee> in the memory unit 11 (S13). In the database shown in FIG. 3, for example, when a record beginning with the reserved word <employee id="001"> is read, the description

```
<employee id="001">
    <name>Ichirou Sato</name>
    <section>General Affairs</section>
    <sex>M</sex>
    <age>25</age>
</employee>
``` is read, and data expressing
Employee ID: 001
Name: Ichirou Sato
Section: General Affairs
Sex: Male (M)
Age: 25
   are buffered to the memory unit 11.
   When the read record begins with the reserved word <Employee id= . . . > (YES in S12), on the other hand, the reserved word starts with the letter "E" rather than the prescribed letter "e". Therefore, the processing unit 10 assumes that the content of the record has already been updated in the manner described above and does not handle the data relating to the description up to the corresponding reserved word </Employee> as print data (S14). In other words, the data of the record starting with the reserved word <Employee id= . . . > are not buffered. More specifically, when a record starting with the reserved word <Employee id="015"> is read from the database shown in FIG. 3, the description

```
<Employee id="015">
    <name>Jirou Sato</name>
    <section>Personnel</section>
    <sex>M</sex>
    <age>29</age>
</Employee>
``` is read, but the data corresponding to the description, which express
Employee ID: 015
Name: Jirou Sato
Section: Personnel
Sex: Male (M)
Age: 29
   are excluded from the printing processing and not buffered to the memory unit 11.
   The processing unit 10 executes this processing (S12 and S13 or S14) repeatedly while determining whether or not the processing has been executed on all of the records within a specified range of the database stored in the flash memory 14 (S15). During this process, for example, when a record beginning with the reserved word <employee id="015"> is read from the database shown in FIG. 3, the description

```
<employee id="015">
    <name>Jirou Sato</name>
    <section>Accounting</section>
```

-continued

```
    <sex>M</sex>
    <age>29</age>
</employee>
``` is read, and data expressing
Employee ID: 015
Name: Jirou Sato
Section: Accounting
Sex: Male (M)
Age: 29
   are buffered to the memory unit 11.
   When the processing has been executed on all of the records (YES in S15), the processing unit 10 controls the printer drive circuit 13 to execute printing in accordance with the record unit data buffered to the memory unit 11 (S16). As a result, the printing unit 20 is operates to print out the employee list.
   According to the printing processing described above, when the lower case letter "e" of the reserved word character strings sandwiching the description corresponding to the record is modified to the upper case letter "E", or, in other words, the sixth bit from the right of "01100101b", in terms of binary notation, is modified from 1 to 0 to obtain the binary notation "01000101b", or more specifically when the reserved words sandwiching the description corresponding to the record are <Employee id= . . . > and </Employee>, the record corresponding to the description sandwiched between the reserved words <Employee id= . . . >, </Employee> is excluded from the printing processing. Therefore, the content of the data that are updated as described above (see the processing flow shown in FIG. 2) can be printed.
   In the case of the database shown in FIG. 3, for example, Employee ID: 015
Name: Jirou Sato
Section: Accounting
Sex: Male (M)
Age: 29
   which is expressed by the description

```
<employee id="015">
    <name>Jirou Sato</name>
    <section>Accounting</section>
    <sex>M</sex>
    <age>29</age>
</employee>
``` sandwiched between the reserved words <employee id="015">, </employee>, is printed instead of
Employee ID: 015
Name: Jirou Sato
Section: Personnel
Sex: Male (M)
Age: 29
   which is expressed by the description

```
<Employee id="015">
    <name>Jirou Sato</name>
    <section>Personnel</section>
    <sex>M</sex>
    <age>29</age>
</Employee>
``` sandwiched between the reserved words <Employee id="015">, </Employee>. In other words, the section of the employee identified by "Employee ID: 015, Name: Jirou Sato" is printed out with the updated section "Accounting" rather than the original section "Personnel".

Note that in the above example, the printer device includes a data updating function (see the processing flow shown in FIG. 2), but the data updating function may be realized in another machine (a personal computer, for example) to which a flash memory is connected.

Further, in the above example, the letter at the head of each of the reserved words <employee id= . . . >, </employee> sandwiching the description that corresponds to the record is changed from "e" to "E", but as long as a bit of a binary representation of the character strings constituting the reserved words sandwiching the description that corresponds to the record is modified from 1 to 0, there are no particular limitations on the manner in which the characters are modified.

As described above, the data updating device according to the present invention is capable of shortening the time required to update data in a flash memory and suppress reductions in the lifespan of the flash memory, and is, therefore, useful as a data updating device for updating data that are stored in record units in a flash memory and described in a markup language such as XML by modifying a description content thereof.

Further, the printer device according to the present invention executes printing processing in accordance with data described in a markup language that have been modified by the data updating device such that the updated content is printed out correctly, and is, therefore, useful as a printer device for executing printing in accordance with data described in a markup language.

FIG. 1

14 FLASH MEMORY
15 OPERATION UNIT
16 INTERFACE
11 MEMORY UNIT
10 PROCESSING UNIT
13 PRINTER DRIVE CIRCUIT
20 PRINTING UNIT

FIG. 2

S1 DATABASE MODIFICATION REQUEST
S2 NEW RECORD TO BE ADDED?
S3 MODIFY employee IN RESPECTIVE CHARACTER STRINGS OF TWO TAGS RELATING TO UPDATE SUBJECT RECORD TO Employee
S4 ADD RECEIVED DATA AS NEW RECORD

FIG. 4

S11 START READING DATABASE
S12 RECORD STARTING WITH TAG CONSTITUTED BY CHARACTER STRING Employee?
S13 STORE DATA UP TO /employee IN BUFFER AS PRINT DATA
S14 DO NOT HANDLE DATA UP TO /Employee AS PRINT DATA
S15 ALL RECORDS?
S16 PRINT

The invention claimed is:

1. A data updating device comprising:
a flash memory storing a plurality of records annotated by a markup language, each record being associated with a plurality of related reserved words stored in lower case letters, and each record containing a plurality of information pieces, each information piece in each record being associated with a respective reserved word;
a reserved word modifier that changes a character in a string of characters constituting a first reserved word from lower case to upper case, wherein the characters constituting a first reserved word are related to a record to obtain a modified first reserved word when a request is issued to change an information piece that is associated with a second reserved word related to said record to another information piece, the first reserved word residing in a first reserved word memory location, and wherein the character is changed from lower case to upper case by changing from a bit in a string of binary bits from 1 to 0; and
a data adder for additionally recording, in said flash memory, another record that includes said another information piece in association with another second reserved word and another first reserved word related to said another second reserved word,
wherein the modified reserved word is maintained in said first reserved word memory location, and the record associated with the modified reserved word is maintained in its respective memory location but designated as inactive.

2. The data updating device according to claim 1, wherein said markup language is XML.

3. A printer device for, comprising:
a flash memory storing a plurality of records annotated by a markup language, each record being associated with a plurality of related reserved words stored in lower case letters, and each record containing a plurality of information pieces, each information piece in each record being associated with a respective reserved word;
a reserved word determiner for determining whether or not a bit in a string of binary bits that represents a character in a character string defining a reserved word has been changed from 1 to 0; and
a controller that excludes a record associated with said reserved word from said printing when said reserved word determiner determines that said bit in said reserved word has been changed from 1 to 0,
wherein change from 1 to 0 of a bit in said reserved word changes the character in the character string from lower case to upper case and indicates that said record associated with said reserved word is inactive.

4. The printer device according to claim 3, wherein said reserved word determiner determines whether a lower case letter in said reserved word has been changed to an upper case letter.

5. The printer device according to claim 3, wherein said markup language is XML.

6. The printer device according to claim 4, wherein said markup language is XML.

7. The printer device according to claim 1, wherein said makeup language is XML.

* * * * *